US008363572B2

(12) United States Patent
Potts et al.

(10) Patent No.: US 8,363,572 B2
(45) Date of Patent: Jan. 29, 2013

(54) SESSION INITIATION PROTOCOL EXTENSIONS FOR CALL CONTROL AND RESOURCE STATUS MONITORING IN TURRETS AND TURRET SWITCHING SYSTEMS

(75) Inventors: Timothy Potts, East Haven, CT (US); Rajnish Jain, Fairfiled, CT (US)

(73) Assignee: IPC Systems, Inc., Jersey City, NJ (US)

( * ) Notice: Subject to any disclaimer, the term of this patent is extended or adjusted under 35 U.S.C. 154(b) by 278 days.

(21) Appl. No.: 12/762,670

(22) Filed: Apr. 19, 2010

(65) Prior Publication Data

US 2011/0255446 A1     Oct. 20, 2011

(51) Int. Cl.
H04L 12/16 (2006.01)

(52) U.S. Cl. ........................................ 370/259; 370/352

(58) Field of Classification Search .................. None
See application file for complete search history.

(56) References Cited

U.S. PATENT DOCUMENTS

| | | | |
|---|---|---|---|
| 6,763,095 B1 * | 7/2004 | Cermak et al. ............. | 379/93.23 |
| 7,421,732 B2 * | 9/2008 | Costa-Requena et al. ........ | 726/3 |
| 2003/0043992 A1 | 3/2003 | Wengrovitz ................. | 379/229 |
| 2007/0153770 A1 * | 7/2007 | Goyal et al. .................. | 370/352 |
| 2009/0022145 A1 | 1/2009 | Bakshi et al. ................. | 370/352 |
| 2009/0022299 A1 | 1/2009 | Bakshi et al. ............ | 379/220.01 |

OTHER PUBLICATIONS

Drage et al., "A Session Initiation Protocol (SIP) Extension for the Identification of Services: draft-drage-sipping-service-identifiedation-03", The IETF Trust, Mar. 25, 2009, pp. 1-28.

Ott et al., "Private Header (P-Header) Extensions to the Session Initiation Protocol (SIP) for the support of the Services for the European Telecommunications Standard Institute; draft-ott-sip-serv-indication-notification-00", The IETF Trust, Jun. 2007, pp. 1-9.
Avaya, "Application Notes for Speakerbus iD808 *i* turret with Avaya Aura™ Communication Manager and Avaya Aura™ SIP Enablement Services—Issue 1.0" http://support.avaya.com/css/P8/documents/100069599; Nov. 30, 2009, pp. 1-64.
"Notification of Transmittal of the International Search Report and the Written Opinion of the International Searching Authority, or the Declaration", Int'l. Patent Appln. No. PCT/US2011/031525, Aug. 1, 2011, 5 pages.
"Written Opinion of the International Searching Authority", Int'l. Patent Appln. No. PCT/US2011/031525, Aug. 1, 2011, 8 pages.
Franks et al., J., "HTTP Authentication: Basic and Digest Access Authentication" RFC 2617, The Internet Society, Jun. 1999, pp. 1-34.
Gulbrandsen et al., A., "A DNS RR for Specifying the Location of Services (DNS SRV)" RFC 2782, The Internet Society, Feb. 2000, pp. 1-12.

(Continued)

*Primary Examiner* — Robert Wilson
(74) *Attorney, Agent, or Firm* — Fitzpatrick, Cella, Harper & Scinto (57) ABSTRACT

Systems, methods, and computer program products are provided for controlling calls and monitoring resource status for turret systems. A SIP message including at least one of a header field and an event package is received from a SIP user agent over a communication network. The header field includes a first parameter corresponding to a first call feature and the event package includes a second parameter corresponding to a second call feature. At least one of the first call feature and the second call feature is implemented by the softswitch or a SIP-enabled turret in response to the receiving.

18 Claims, 2 Drawing Sheets

OTHER PUBLICATIONS

Baugher et al., M., "Real-Time Transport Protocol Management Information Base" RFC 2959, The Internet Society, Oct. 2000, pp. 1-31,
Donovan, S., "The SIP INFO Method" RFC 2976. The Internet Society, Oct. 2000, pp. 1-9.
Rosenberg et al., J., "SIP: Session Initiation Protocol" RFC 3261, The Internet Society, Jun. 2002, pp. 1-269.
Rosenberg et al., J., "Reliability of Provisional Responses in the Session Initiation Protocol (SIP)" RFC 3262, The Internet Society, Jun. 2002, pp. 1-14.
Rosenberg et al., J., "Session Initiation Protocol (SIP): Locating SIP Servers" RFC 3263, The Internet Society, Jun. 2002, pp. 1-17.
Rosenberg et al., J., "An Offer/Answer Model with the Session Description Protocol (SDP)" RFC 3264, The Internet Society, Jun. 2002, pp. 1-25.
Roach, A. B., "Session Initiation Protocol (SIP)-Specific Event Notification" RFC 3265, The Internet Society, Jun. 2002, pp. 1-38.
Peterson, J., "A Privacy Mechanism for the Session Initiation Protocol (SIP)" RFC 3323, The Internet Society, Nov. 2002, pp. 1-38.
Watson, M., "Short Term Requirements for Network Asserted Identity" RFC 3324, The Internet Society, Nov. 2002, pp. 1-11.
Jennings et al., C., "Private Extensions to the Session Initiation Protocol (SIP) for Asserted Identity within Trusted Networks" RFC3325, The Internet Society, Nov. 2002, pp. 1-17.
Sparks, R., "The Session Initiation Protocol (SIP) Refer Method" RFC3515, The Internet Society, Apr. 2003, pp. 1-23.
Schulzrinne et al., "RTP: A Transport Protocol for Real-Time Applications" RFC 3550, The Internet Society, Jul. 2003, pp. 1-104.
Friedman et al., T., "RT Control Protocol Extended Reports (RTCP XR)" RFC 3611, The Internet Society, Nov. 2003, pp. 1-55.
Rosenberg, J., "A Session Initiation Protocol (SIP) Event Package for Registrations" RFC 3680, The Internet Society, Mar. 2004, pp. 1-26.
Rosenberg et al., J., "Best Current Practices for Third Party Call Control (3pcc) in the Session Initiation Protocol (SIP)" RFC 3725, The Internet Society, Apr. 2004, pp. 1-31.
Rosenberg et al., J., "Indicating User Agent Capabilities in the Session Initiation Protocol (SIP)" RFC 3840, The Internet Society, Aug. 2004, pp. 1-36.
Camarillo et al., G., "Early Media and Ringing Tone Generation in the Session Initiation Protocol (SIP)" RFC 3960, The Internet Society, Dec. 2004.
Schulzrinne et al., H., "RTP Payload for DTMF Digits, Telephony Tomes, and Telephony Signals" RFC 4733, The IETF Trust, Dec. 2006, pp. 1-49.
Lingle et al., K., "Management Information Base for the Session Initiation Protocol (SIP)" RFC 4780, The IETF Trust, Apr. 2007, pp. 1-83.
Elwell, J., "Connected Identity in the Session Initiation Protocol (SIP)" RFC 4916, The IETF Trust, Jun. 2007, pp. 1-24.
Willis et al., D. "Requesting Answering Modes for the Session Initiation Protocol (SIP)" RFC 5373, The IETF Trust, Nov. 2008, pp. 1-24.
Johansson et al., I., "Support for Reduced-Size Real-Time Transport Control Protocol (RTCP): Opportunities and Consequences" RFC 5506, The IETF Trust, Apr. 2009, pp. 1-17.
Mahy, R., "A Message Summary and Message Waiting Indication Event Package for the Session Initiation Protocol (SIP)" RFC 3842, The Internet Society, Aug. 2004, pp. 1-19.
Rosenberg, J., "A Presence Event Package for the Session Initiation Protocol (SIP)" RFC 3856, The Internet Society, Aug. 2004, pp. 1-27.
Mahy et al., R., "The Session Initiation Protocol (SIP) 'Replaces' Header" RFC 3891, The Internet Society, Sep. 2004, pp. 1-16.
Berners-Lee et al., T., "Uniform Resource Identifier (URI): Generic Syntax" RFC 3986, The Internet Society, Jan. 2005, pp. 1-61.
Donovan et al., S., "Session Timers in the Session Initiation Protocol (SIP)" RFC4028, The Internet Society, Apr. 2005, pp. 1-27.
Rosenberg et al., J., "An Invite-Initiated Dialog Event Package for the Session Initiation Protocol (SIP)" RFC 4235, The Internet Society, Nov. 2005, pp. 1-39.
Barnes, M., "An Extension to the Session Initiation Protocol (SIP) for Request History Information" RFC 4244, The Internet Society, Nov. 2005, pp. 1-44.
Handley et al., M., "Session Description Protocol" RFC 4566, The Internet Society, Jul. 2006, pp. 1-49.
Rosenberg et al., J., "A Session Initiation Protocol (SIP) Event Package for Conference State" RFC 4575, The Internet Society, Aug. 2006, pp. 1-48.
Burger et al., "Session Initiation Protocol (SIP) Info Method and Package Framework", The IETF Trust, Jul. 2009, pp. 1-29.

\* cited by examiner

SESSION INITIATION PROTOCOL EXTENSIONS FOR CALL CONTROL AND RESOURCE STATUS MONITORING IN TURRETS AND TURRET SWITCHING SYSTEMS

BACKGROUND OF THE INVENTION

I. Field of the Invention

The present invention generally relates to telecommunication systems, and more particularly to Session Initiation Protocol ("SIP") extensions for call control and resource status monitoring in voice trading systems that include turrets and turret switching systems.

II. Description of the Related Art

A turret system is a specialized key telephony switching system that allows a relatively small number of users to access a large number of external lines and provides enhanced communication features such as hoot-n-holler, push-to-talk, intercom, video, and large-scale conferencing. These features are often utilized in the financial industry such as trading floor environments, as well as security/law enforcement, public safety utilities, healthcare, and customer support (e.g., contact centers) environments.

Users interface with a turret system through a turret device, which is a phone-like desktop device with multiple handsets and speakers and multiple buttons. A turret is either implemented in dedicated hardware (sometimes referred to as a "hard" turret) or a general-purpose computer (sometimes referred to as a "soft" turret). With the advent of Voice over Internet Protocol ("VoIP"), VoIP turret devices have moved from a fixed environment of dedicated voice communications trading resources to a more virtualized trading environment across multiple sites. This virtual environment allows resources to be shared dynamically, when and where required, across a global corporate enterprise.

SIP is an application-layer control (i.e., signaling) protocol for creating, modifying, and terminating interactive communications sessions, such as Internet telephony calls, with one or more participants and is defined in RFC-3261, "SIP: Session Initiation Protocol." SIP-based communication architectures provide the ability to signal and communicate between telephony systems in collaboration with other protocols such as Session Description Protocol ("SDP") and Real-Time Protocol ("RTP"). SDP describes streaming media initialization parameters in an ASCII string and multimedia communication sessions for the purposes of session announcement, session invitation, and parameter negotiation. SDP is defined in RFC-4566, "SDP: Session Description Protocol." RTP is a standardized packet format for delivering audio and/or video data over IP networks and is defined by RFC-3550. RFC-3261, RFC-4566, and RFC-3350 are hereby incorporated by reference in their entirety.

Supporting additional functionality, such as call control and resource status monitoring, for turrets and turret switching systems using SIP requires extensions to the base SIP protocol.

BRIEF DESCRIPTION

The example embodiments described herein provide SIP extensions for call control and resource status monitoring in turrets and turret switching systems.

In one embodiment, a method for controlling calls and monitoring resource status for turret systems is provided. A SIP message including at least one of a header field and an event package is received from a SIP User Agent (UA) over a communication network. The header field includes a first parameter corresponding to a first call feature and the event package includes a second parameter corresponding to a second call feature. At least one of the first call feature and the second call feature is implemented by the softswitch in response to the receiving.

In another aspect, the SIP message includes at least one of an INVITE message, an INFO message, a NOTIFY message, an UPDATE message, a PRACK message, and an ACK message.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings.

DETAILED DESCRIPTION

Example embodiments of the present invention are directed to Session Initiation Protocol extensions for call control and resource status monitoring in turrets and turret switching systems, which are now described herein in terms of an example turret communication system in a trading environment. This is for convenience only and is not intended to limit the application of the present invention. In fact, after reading the following description, it will be apparent to one skilled in the relevant art(s) how to implement the following invention in alternative environments, such as financial, security/law enforcement, utilities, healthcare, customer support, contact center environments, and the like.

I. System

Figure 1:
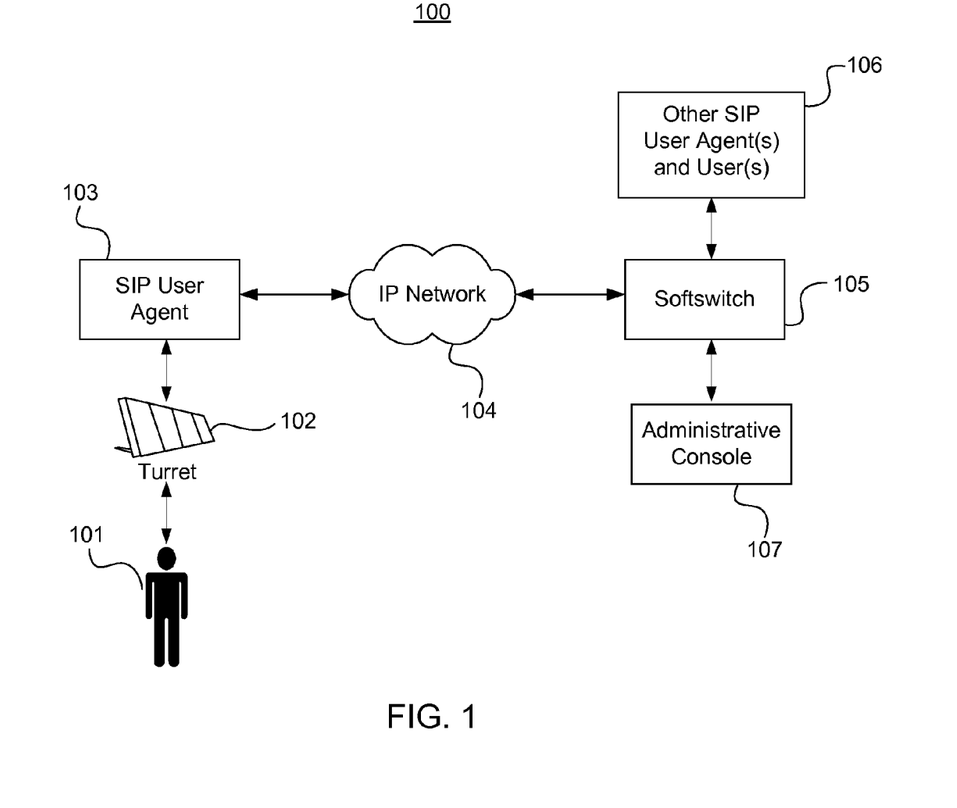
FIG. 1 depicts a block diagram of an example communication system in accordance with an embodiment of the present invention.

FIG. 1 depicts a block diagram of an example communication system 100 in accordance with an embodiment of the present invention. Communication system 100 includes a turret device 102 through which a user 101 can communicate with users of other communication devices. The turret device 102 can be a hard turret or a soft turret. Embodiments where the turret device 102 is replaced with another communication device—such as a hard telephone, a soft telephone, a mobile telephone, a PDA, a general purpose PC, and the like—also are contemplated. Communication system 100 also includes a SIP user agent 103 functioning as a logical network endpoint that creates and/or receives SIP messages and manage SIP sessions.

In general, the user 101 interacts with the turret device 102 via a user interface to communicate with users of other SIP user agents 106. As shown in FIG. 1, the turret device 102 is communicatively coupled to a SIP user agent 103 over, for example, a network or a proprietary communication line. Although FIG. 1 shows the SIP user agent 103 as being separate from the turret device 102, embodiments where the SIP user agent 103 is included as part of the turret device 102 are contemplated and are within the scope of the embodiments described herein.

The SIP user agent 103 is communicatively coupled via an Internet Protocol (IP) network 104 to a softswitch 105, which, in turn, is communicatively coupled to other SIP user agents 106 and users via, for example, an IP network running the SIP protocol. The softswitch 105 connects SIP communication sessions between the turret 102 and other SIP user agents 106 by means of software running on a computer system. The softswitch 105 also is communicatively coupled to an administrative console 107, through which administrators control the operation and/or configuration of the softswitch 105.

For the sake of brevity, the system 100 only shows SIP user agents 103 and 106. Embodiments including more than two SIP user agents, turrets, and other communication devices sharing a SIP session by using the SIP protocol, however, are contemplated and are within the scope of the embodiments described herein. For example, if three or more SIP user agents and/or turrets are included in system 100, party-line communication is possible. System 100 may also include additional SIP user agents configured to function as redundant backups in the event of a SIP user agent malfunction. Similarly, system 100 may include additional turrets, which are configured to function as redundant backups in the event of a turret malfunction.

The SIP user agent 103 and the softswitch 105 utilize RFC-3261 as their communication and signaling protocol. SIP extensions, i.e., extensions to RFC-3261, are provided to enable the turret 102 and the softswitch 105 to implement certain call features, such as those described below. In general, these extensions include header fields and event packages, which are discussed below in further detail.

II. SIP Extensions

A. Header Fields

An example header field name format is shown below, where [header] represents any desired header field name:
X-IPC-[header]
As those skilled in the art will recognize, other header field name formats are contemplated and are within the scope of the embodiments described herein.

Following each header field name is a colon and a header field value for each parameter corresponding to the header field. In some embodiments, header field values for parameters are represented by lower case letters with no spaces between characters. Some headers fields include only a single parameter. In this case, the header field value for that parameter follows the header as shown below, where [value] represents any desired value for the parameter:
X-IPC-[header]: [value]
As shown below, for header fields may include multiple parameters, where each parameter is followed by an equals sign ("=") then the value of the parameter. Semicolons may be used to separate parameters:

---
X-IPC-[header]:
 parameter1=[value];parameter2=[value];parameter3=[value]
---

1. Call Party

Information associated with a call party, i.e. a calling party or a called party, is indicated in a "call party header" field. For example, in cases where the call parties are using different communications modes, such as handset call, speakers phone call, or hands-free-module, the types of mode in use can be indicated in the call party header. Notification may be performed by the communication device itself or a central server. Referring again to FIG. 1, notification is communicated by the SIP user agent 103 by transmitting to the softswitch 105 a call party INVITE message, or a 200 OK message in response to a call party INVITE message. The INVITE OR 200 OK messages indicate whether a call is a handset call, a speaker call, or a hands-free-module call and indicating a particular channel for the call. An example call party header field is shown below:
X-IPC-CallParty: device=[value];channel=[value]

"Device parameter" indicates whether the call mode is a handset call, a speaker call, or a hands-free-module call. In an example embodiment, the value of the device parameter is "handset" for a handset call, "speaker" for a speaker call, and "hfm" for a hands-free-module call. In addition, or alternatively, if the call is established without the call party header field, the softswitch 105 may default the device parameter to a value corresponding to a handset call.

"Channel parameter" indicates a channel to be used for a call. For a handset call or a hands-free-module call, for instance, the value of the channel parameter indicates whether the call uses a left channel or a right channel. For a speaker call, the value of the channel parameter indicates the speaker number (e.g., 1 to 24) for the call.

Shown below are examples of header fields indicating device and channel parameters for particular turret calls which softswitch 105 transmits via INVITE messages to the SIP user agent 103:

---
X-IPC-CallParty: device=handset;channel=left
X-IPC-CallParty: device=handset;channel=right
X-IPC-CallParty: device=hfm;channel=left
X-IPC-CallParty: device=hfm;channel=right
X-IPC-CallParty: device=speaker;channel=1
---

2. Call (Type and Usage)

A "call header field" indicates a call type and a usage for each call made by or to turret 102. The call header field is transmitted between the SIP user agent 103 and the softswitch 105 in INVITE messages. An example call header field is shown below:
X-IPC-Call: type=[type];usage=[usage]

"Type" parameter indicates a call feature and "usage" parameter indicates an attribute of the call feature. In some cases, a usage parameter is unnecessary. If this is the case, the SIP user agent 103 and the softswitch 105 transmit a call header field that does not include the usage parameter, as shown below:
X-IPC-Call: type=[type]

a. Resource (Line)

One example call type parameter is a "line" parameter (also sometimes referred to as a "resource"). In one embodiment, there are four types of lines: a private line, a dial tone line, an open connection line, and an operator overflow protection service (OOPS) line. Private lines further include an automatic ring down (ARD) line, a manual ring down (MRD) line, and a hoot-n-holler line, which is an MRD line with no signaling. In some cases, resource attributes, such a line type, are indicated by button configuration data. In these cases, the type parameter in a call header field is set to resource for all four resource types. The usage parameter in the call header field indicates the appearance number for the corresponding resource. Private lines can have only one appearance, and dial tone lines can have many appearances. An example call header field is shown below, where [appearance] represents any desired value for the usage parameter:
X-IPC-Call: type=resource;usage=[appearance]

For example, for a call from appearance 4, the call header field is as follows:

X-IPC-Call: type=resource;usage=4

An example call header field for implementing point-to-point call between the softswitch 105 and the SIP user agent 103 is shown below:

X-IPC-Call: type=icmp2p

An example call header field for implementing group call between the softswitch 105 and the SIP user agent 103 is shown below:

X-IPC-Call: type=icmgroup

An example call header field for implementing a group call with group answer between the softswitch 105 and the SIP user agent 103 is shown below:

X-IPC-Call: type=icmgroup;usage=gans

An example call header field for implementing a group call with group talkback communicated between the softswitch 105 and the SIP user agent 103 is shown below:

X-IPC-Call: type=icmgroup;usage=gtbk b. Broadcast Calls (Conference & Simplex)

Another usage for the call header field is to initiate a broadcast call, such as a conference broadcast, i.e., multi-line full-duplex, call or a simplex broadcast, i.e., multi-line half-duplex, call. To create a conference call, the SIP user agent 103 transmits to the softswitch 105 an INVITE message including a call header field with the type parameter set to broadcast and the usage parameter set to conference. An example call header field to create a conference call that can be transmitted by the SIP user agent 103 to the softswitch 105 is shown below:

X-IPC-Call: type=broadcast;usage=conference

To create a simplex broadcast, i.e., multi-line half-duplex, call, the SIP user agent 103 transmits to the softswitch 105 an INVITE message including a call header field with the type parameter set to broadcast and the usage parameter set to simplex. An example call header field for creating a simplex call that can be, for example, transmitted by the SIP user agent 103 to the softswitch 105, is shown below:

X-IPC-Call: type=broadcast;usage=simplex c. Recording

The call header field can also be used to initiate a recording of a call. To initiate a recording, the softswitch 105 transmits to the SIP user agent 103 an INVITE message including a call header field with the "type" parameter set to "record" and the usage parameter set to [record_stream], which represents a record stream number used to uniquely identify the recording. Configuration data identifying which turret channels to mix together for each recording stream can also be included in the call header field. An example call header field for creating a recording of a call transmitted by the softswitch 105 to the SIP user agent 103 is shown below:

X-IPC-Call: type=record;usage=record_stream d. Recording Playback

Another usage for the call header field is to initiate playback of a recorded call. To initiate playback of a recorded call, the softswitch 105 transmits to the SIP user agent 103 an INVITE message including a call header field with the type parameter set to playback. An example call header field for initiating a playback of a recorded call that can be, for example, transmitted by the softswitch 105 to the SIP user agent 103, is shown below:

X-IPC-Call: type=playback e. Diagnostics

The call header field also is used for initiating a diagnostic call, for example, to validate that a tone generated as part of a loopback test is properly received from another SIP user agent 106. To initiate a diagnostic call, the softswitch 105 transmits to the SIP user agent 103, via third party call control (3PCC), an INVITE message including a call header field with the type parameter set to diagnostics. An example call header field used to initiate a diagnostic call which can be, for example, transmitted by the softswitch 105 to the SIP user agent 103, is shown below:

X-IPC-Call: type=diagnostics f. Forced Line Clear

Yet another usage for the call header field is to force a resource, or line, clear. To clear a line, the SIP user agent 103 places a call that indicates that the call is to force clear the line, i.e., to remove all parties from the line. The SIP user agent 103 accomplishes this by transmitting to the softswitch 105 an INVITE message including a call header field with the type parameter set to forceclear. An example call header field used to force a line clear which can be, for example, transmitted by the SIP user agent 103 to the softswitch 105 is shown below:

X-IPC-Call: type=forceclear

3. Token (Device Authentication Token)

A token header field is used to authenticate devices, e.g., to confirm that a device used to place a call is an approved SIP device, and to prevent the use of non-approved SIP devices. A hash is created and added to requests and responses. In some embodiments, to avoid the processing involved in computing the hash for every request, the hash is only computed as part of the device registration process and the heartbeat process. An example token header field, where [token] represents the MD5 hash value for a set of SIP header fields, is shown below:

X-IPC-Token: [token]

A contact header field, i.e. a header field indicating the contact parameter, is included in all REGISTER and OPTIONS requests and their responses to enable authentication of the hash value. Upon receiving requests, the softswitch 105 performs the MD5 hash function on a set of SIP header fields and compares the results to the hash value included in the token header field. If the two hash values match, the device has been successfully authenticated. If the two hash values fail to match, or if REGISTER and OPTIONS requests fail to include a token header field and a hash value, then the device is considered a non-approved device. Based on a predetermined policy, the softswitch 105 either permits or denies calls from non-approved devices.

4. Augmentation (Soft Turret Augmentation Initiated)

An augmentation header field is transmitted by the softswitch 105 to indicate that an INVITE request sent directly to the SIP user agent 103 was initiated by the user 101 through a soft turret while performing 3PCC. The soft turret is executed on a computer to augment a hard turret, for example, by enabling a trader to enter a phone number via the computer, rather than via the hard turret. The SIP user agent 103 uses the augmentation header field to emulate the user 101 and prevent diagnostics and other 3PCC calls from accidentally releasing an active call. Example augmentation header fields are shown below:

X-IPC-Augmentation: on
X-IPC-Augmentation: off

5. Logon

To enable logging the user 101 onto a station device, which is any device, such as a hard or soft turret, communicatively coupled to the IP network 104, the softswitch 105 transmits to the SIP user agent 103 an AOR and an encrypted password for the user 101. During each logon, the SIP user agent 103 transmits to the softswitch 105 the encrypted password for authentication. The softswitch 105 uses the encrypted password to create a hash for use in authentication.

A logon header field indicates whether a logon request was generated by the user 101 or generated by a backroom, i.e., the softswitch 105, as well as whether the user 101 wishes to force a logoff from other station devices in the event the user 101 is logged onto other station devices. For backroom logons, the SIP user agent 103 transmits to the softswitch 105 a REGISTER request including a logon header field having a value of backroom, indicating that a logon has been initiated by the softswitch 105, as shown below:

X-IPC-Logon: backroom

For user logons, the SIP user agent 103 transmits to the softswitch 105 a REGISTER request including a logon header field having a value of user, as shown below:

X-IPC-Logon: user

As shown below, for user logons with forced logoffs, the SIP user agent 103 transmits to the softswitch 105 a REGISTER request including a logon header field having a value of user;forced, instructing the softswitch 105 to forcefully logoff the user 101 of any other station devices which the user 101 is logged onto:

X-IPC-Logon: user;forced

6. Privacy

A privacy header field is transmitted as part of an INVITE message from the SIP user agent 103 to the softswitch 105 to enable privacy for a call. Call privacy can be enabled for a call prior to the call being placed. Example privacy header fields enabling and disabling privacy are shown below:

X-IPC-Privacy: on
X-IPC-Privacy: off

To enable or disable privacy while a call is in progress, the SIP user agent 103 transmits to the softswitch 105 an INFO message including the privacy header field.

7. Muting

To enable or disable muting for a call, the SIP user agent 103 transmits to the softswitch 105 an INVITE message including a mute option header field. The mute option header field enables a global mute, enables a local mute, or disables muting for a call. Example mute option header fields are shown below:

X-IPC-MuteOption: global
X-IPC-MuteOption: local
X-IPC-MuteOption: no

8. Talkback

To enable or disable a talkback call feature for speaker calls that are initiated or answered with push-to-talk enabled, the SIP user agent 103 transmits to the softswitch 105 an INVITE message or a 200 OK message including a talkback header field. Example talkback header fields are shown below:

X-IPC-Talkback: on
X-IPC-Talkback: off

In one embodiment, the talkback header field is enabled for all handset calls by default.

9. Recording

A recording header field indicates whether recording is enabled or disabled for a call. To enable or disable recording the SIP user agent 103 transmits to the softswitch 105 an INVITE message or a 200 OK message including a recording header field. In one embodiment, recording is enabled by default for all calls that do not include a recording header field. Example recording header fields are shown below:

X-IPC-Recording: on
X-IPC-Recording: off

B. SIP Events and Event Packages

As described below in further detail, to implement call features beyond those defined in the SIP protocol, custom event packages are transmitted between the SIP user agent 103 and the softswitch 105.

1. INFO

In one embodiment, a custom event package takes the form of an INFO message. That is, the event package is transmitted between the SIP user agent 103 and the softswitch 105 as part of an INFO message. In some embodiments, the message is sent in accordance with "Session Initiation Protocol (SIP) INFO Method and Package Framework draft-ietf-sipcore-info-events-02," or its equivalent. "Session Initiation Protocol (SIP) INFO Method and Package Framework draft-ietf-sipcore-info-events-02" is a framework that defines an INFO package mechanism for carrying application level information between endpoints, and is hereby incorporated by reference in its entirety.

The framework also defines a procedure by which a SIP user agent indicates to other endpoints its support for receiving INFO messages carrying application level information within a dialog. The SIP user agent 103 and the softswitch 105 indicate their support for receiving events, i.e., application information within a dialog, by transmitting to each other a message that includes a recv-info header with a value of, for example, "x-ipc-events." An example recv-info header is shown below:

Recv-Info: x-ipc-events

The message including the recv-info header is transmitted between endpoints either during dialog establishment or during a mid-dialog target refresh. For example, the recv-info header can be included as part of one or more SIP messages, such as an INVITE message, an UPDATE message, a PRACK message, and ACK message, and their corresponding non-failure responses, i.e., 101-199 and 2xx messages.

An example sequence of the establishment of a dialog supporting receipt of INFO messages carrying application level information will now be described. During establishment of a dialog, the SIP user agent 103 transmits to the softswitch 105 an INVITE message that includes a recv-info header indicating the SIP user agent's 103 support for receiving INFO messages carrying application level information during the dialog. The softswitch 105 responds by transmitting to the SIP user agent 103 a 200 OK message that includes a recv-info header indicating the softswitch's 105 support for receiving INFO messages carrying application level information during the dialog.

In another embodiment, the SIP user agent 103 indicates support for receiving specific INFO events by sending to the softswitch 105 an INFO message including an info-package header and message body event parameters. The INFO message requests support for specific features indicated within its message body. In general, each INFO message has a corresponding INFO package. As shown below, an example message body includes "Info-Package" as the value for the "Content-Disposition" parameter and includes "application/x-ipc-info-package+xml" as the value for the "Content-Type" parameter:

```
Info-Package: x-ipc-events
Content-Disposition: "Info-Package"
Content-Type: application/x-ipc-info-package+xml
```

2. NOTIFY

In another embodiment, the custom event package takes the form of a NOTIFY message. That is, the event package is transmitted between the SIP user agent 103 and the softswitch 105 as part of a NOTIFY message. In some embodiments, the NOTIFY message is communicated according to RFC-3265, "Session Initiation Protocol (SIP) Specific Event Notification," which defines a framework by which a SIP user agent can request notification from other endpoints indicating that certain events have occurred. RFC-3265 is hereby incorporated by reference in its entirety. A custom event, which is named, for example, x-ipc-event, is defined for implementing proprietary call features. An example NOTIFY message calling out such an event includes the following:

```
Event: x-ipc-events
Content-Type: application/x-ipc-info-package+xml
```

3. Events

Example events for specific features having corresponding message body parameters, sub-parameters, methods, and directions of transmission are shown below in Table 1. The term AS in the table below stands for "application server" and is interchangeable with softswitch 105 described herein.

TABLE 1

| Feature | Message Body Parameter | Sub Parameters | Method | Direction |
| --- | --- | --- | --- | --- |
| Privacy | privacy | mode=on/off<br>result=pass/fail<br>reason=string | INFO | UA<->AS |
| Recording | record | mode=on/off | INFO | UA->AS |
| 3PCC & Diagnostic | injectAudio | audioID=integer<br>direction=touser/tonetwork/both<br>duration=integer<br>action=validate | INFO | AS->UA |
| 3PCC & Diagnostic | removeAudio | audioID=integer<br>direction=touser/tonetwork/both | INFO | AS->UA |
| 3PCC & Diagnostic | audioValidation | result=pass/fail<br>reason=string<br>MOS=integer | INFO | UA->AS |
| Talkback | talkback | mode=on/off | INFO | UA->AS |
| Conference | conference | action=addparty/removeParty<br>aor=AOR<br>appearance=integer<br>result=pass/fail<br>reason=string | INFO | UA<->AS |
| Diversion | diversion | entity=aor<br>divert_reason=none /<br>immediate / busy / ring-no-answer / busy-ring-no-answer<br>destinationimmbusy= string<br>destinationrna=string | NOTIFY | AS->UA |
| Barge Party Notification | barge | name=string<br>numHandsetUsers=integer | INFO | AS->UA |
| Logoff | logoff | None | NOTIFY | AS->UA |
| Logon | logon | user=string<br>password=string | NOTIFY | AS->UA |
| Centerline | centerline | message=string=on/off | NOTIFY | AS->UA |
| Failover | failover | zoneID=integer | NOTIFY | AS->UA |
| Button Press | button | buttonID=integer | INFO or NOTIFY | UA<->AS |
| Recall | recall | None | INFO | UA->AS |
| Hold via 3PCC | hold | None | INFO | AS->UA |
| Signal | signal | mode=on/off | INFO | UA->AS |
| Reboot | reboot | None | NOTIFY | AS->UA |
| Profile Change | profileChange | entity=string<br>attribute=string<br>referenceID=integer | NOTIFY | AS->UA |

As described above, the body of the message can be custom. In some embodiments, the body of the message includes extensible markup language ("XML") carrying event parameters, as described below in further detail with respect to specific events.

4. Privacy

The SIP user agent 103 enables and disables its privacy during a communication session by sending an INFO message to the softswitch 105 including an event header having a value of x-ipc-events. An example XML message body enabling privacy for the SIP user agent 103 is shown below:

```
<?xml version="1.0"?>
<x-ipc-info-package>
    <event> privacy </event>
    <privacy>
        <mode> on </mode >
    </privacy>
</x-ipc-info-package>
```

5. Record

If recording is currently disabled the SIP user agent 103 can request to enable recording during a communication session. If recording is currently enabled the SIP user agent 103 can request to disable recording during the communication session. An example XML message body enabling recording for the SIP user agent 103 is shown below:

```
<?xml version="1.0"?>
<x-ipc-info-package>
    <event> record </event>
    <record>
        <mode> on </mode>
    </record>
</x-ipc-info-package>
```

6. Talkback

The SIP user agent 103 enables talkback during speaker calls, for example, in response to a push-to-talk button being pressed. An INFO message is transmitted from the SIP user agent 103 to the softswitch 105 including an event header having a value of x-ipc-events. An example XML message body enabling talkback for the SIP user agent 103 is shown below:

```
<?xml version="1.0"?>
<x-ipc-info-package>
    <event> talkback </event>
    <talkback>
        <mode> on </mode>
    </talkback>
</x-ipc-info-package>
```

7. Conference

The SIP user agent 103 and the softswitch enable or disable conference, i.e., add or remove another SIP user agent to or from a call in progress by transmitting to each other an INFO message including an event header having a value of x-ipc-events. The identity of the resource being conferenced is indicated by the address of record ("AOR") field and the appearance field. If the resource is a dial tone resource, the digits are dialed after the INFO messages are exchanged between the SIP user agent 103 and the softswitch 105. An example XML message body enabling a conference call, i.e., adding a party to a call in progress, is shown below:

```
<?xml version="1.0"?>
<x-ipc-info-package>
    <event> conference </event>
    <conference>
        <action> addparty </action>
        <aor> sip:1729@ipc.com </aor>
        <appearance> 4 </appearance>
    </conference>
</x-ipc-info-package>
```

8. Diversion

The SIP user agent 103 programs call diversion settings, such as call forwarding, by transmitting an HTTP request to the softswitch 105. In response, the softswitch 105 transmits a NOTIFY message including an event header having a value of x-ipc-events to all SIP user agents associated with the call diversion. An example XML message body programming a call diversion for the SIP user agent 103 is shown below:

```
<?xml version="1.0"?>
<x-ipc-info-package>
    <event> diversion </event>
        <diversion>
            <entity> sip:1024@ipc.com </entity>
            <divert_reason> immediate </divert_reason>
            <destinationImmBusy> sip:1024@ipc.com
</destination>
            <destinationRNA> sip:1024@ipc.com </destination>
        </diversion>
</x-ipc-info-package>
```

9. Centerline

A network administrator can send to the SIP user agent 103 through the administrative console 107 a message including a text string and a ring preference. A NOTIFY message is sent to the SIP user agent 103 carrying the text string and the ring preference parameters. An example XML message body for ringing the SIP user agent 103 and communicating an instruction to log off is shown below:

```
<?xml version="1.0"?>
<x-ipc-info-package>
    <event>centerline</event>
    <centerline>
        <message> Please logoff </message>
        <ring> yes </ring>
    </centerline>
</x-ipc-info-package>
```

10. Backroom Logon

The softswitch 105 logs a user onto a station device, such as a hard or soft turret, by transmitting to SIP user agent 103 a NOTIFY message including an AOR and an encrypted password for user 101. An example NOTIFY message from the softswitch 105 to the SIP user agent 103 is shown below:

```
NOTIFY sip:DeviceID@ipc.com SIP/2.0
Via: SIP/2.0/TCP
terminal.example.com;branch=z9hG4bKwYb6QREiCL
Max-Forwards: 70
To: <sip:turret1@ipc.com>
```

```
From: <sip:as1.ipc.com>;tag=ie4hbb8t
Call-ID: cdB34qLToC@terminal.example.com
CSeq: 1 NOTIFY
Contact: <sip:as1.ipc.com>
Event: x-ipc-events
Subscription-State: active; expires=3599
Expires: 7200
Content-Type: application/x-ipc-events-info+xml
Content-Length: 337
<?xml version="1.0"?>
<x-ipc-info-package>
    <event>logon </event>
    <logon>
        <user> babe.ruth </user>
        <password> a9887dfed3434356fdec343 </password>
    </logon>
</x-ipc-info-package>
```

The SIP user agent 103 uses the encrypted password during logon authentication. In particular, the SIP user agent 103 transmits to the softswitch 105 a backroom event in a NOTIFY message, which instructs the softswitch 105 to use the encrypted password for creating a hash.

11. Forced Logoff and Logon

If the user 101 wants to force a log off, for example, if the SIP user agent 103 is currently logged onto a station device distant from the current location of user 101, the user 101 forces the log off by transmitting to the softswitch 105 a REGISTER request including the string "X-IPC-Logon:user; forced". Upon receiving the REGISTER request, the softswitch 105 forces the SIP user agent 103 to logoff by transmitting to the SIP user agent 103 a NOTIFY message including an event of x-ipc-events. An example XML message body of such a NOTIFY message is shown below:

```
<?xml version="1.0"?>
<x-ipc-info-package>
    <event>logoff</event>
</x-ipc-info-package>
```

The user 101 can force a log on to a station device using a similar mechanism as discussed above for forcing a log off of a station device.

12. Failover and Failback

In the event of a failure of a network or zone, the SIP user agent 103 fails over, i.e., switches over, to a redundant or standby network or zone. A management system (not shown) of the softswitch 105 instructs the turret 102 to failover from the failed zone to the redundant zone by transmitting to the softswitch 105 a NOTIFY message including a failover event. In response to receiving the NOTIFY message from the management system of the softswitch 105 forwards to the SIP user agent 103 the NOTIFY message including an event x-ipc-events. The NOTIFY message body contains the event type as failover and a zoneID parameter, which in some embodiments is an integer. If the zoneID parameter has a value that is outside a predetermined range of values, or if the zoneID indicates a zone for which the turret 102 has not been programmed, the SIP user agent 103 ignores the failover event. An example XML message body instructing a failover is shown below:

```
<?xml version="1.0"?>
<x-ipc-info-package>
```

```
    <event>failover</event>
    <failover>
        <zoneID> 2 </zoneID>
    </failover>
</x-ipc-info-package>
```

Once the failed zone has been resolved, the SIP user agent 103 fails back, i.e., switches back, to the original zone. The management system of the softswitch 105 instructs the turret 102 to failback from the redundant zone to the failed zone by transmitting to the softswitch 105 a NOTIFY message including a failback event. In response to receiving the NOTIFY message from the management system of the softswitch 105, the softswitch 105 forwards to the SIP user agent 103 the NOTIFY message including an event x-ipc-events. The NOTIFY message body contains the event type as failback and a zoneID parameter, which in some embodiments is an integer. If the zoneID parameter has a value that is outside a predetermined range of values, or if the zoneID indicates a zone for which the turret 102 has not been programmed, the SIP user agent 103 ignores the failback event. An example XML message body instructing a failback is shown below:

```
<?xml version="1.0"?>
<x-ipc-info-package>
    <event>failback</event>
    <failback>
        <zoneID> 1 </zoneID>
    </failback>
</x-ipc-info-package>
```

C. Third Party Call Control and Diagnostics

Once the softswitch 105 has established a call between the SIP user agent 103 and another SIP user agent 106, the softswitch 105 requests the SIP user agent 103 to generate audio, validate it, and report the result by transmitting to the SIP user agent 103 an audio INFO package including an event x-ipc-events and audio event parameters. An example XML message body implementing audio generation and validation is shown below:

```
<?xml version="1.0"?>
<x-ipc-info-package>
    <event> injectAudio</event>
    <injectAudio>
        <audioID> 32322 </audioID>
        <direction> ToUser </direction>
        <duration> 5 </duration>
        <action> validate </action>
    </injectAudio>
</x-ipc-info-package>
```

In response to receiving the audio INFO package, the SIP user agent 103 transmits to the softswitch 105 a reporting INFO message indicating the success or failure of the audio generation. An example XML message body of a reporting INFO message is shown below:

```
<?xml version="1.0"?>
<x-ipc-info-package>
    <event> audioValidation </event>
    <audioValidation>
```

-continued

```
    <result> pass </result>
    <MOS> 4 </MOS>
  </iaudioValidation>
</x-ipc-info-package>
```

1. Signal

The SIP user agent 103 signals other SIP user agents 106 on a private line by transmitting an INFO message including the x-ipc-events package. An example XML message body signaling a SIP user agent on a private line is shown below:

```
<?xml version="1.0"?>
<x-ipc-info-package>
    <event>signal</event>
    <signal>
        <mode> on </mode>
    </signal>
</x-ipc-info-package>
```

2. Button

The softswitch 105 requests user 101 to press a particular button on the turret 102 by transmitting to the SIP user agent 103 an INFO message or a NOTIFY message. An example XML message body requesting user 101 to press a particular button on the turret 102 is shown below:

```
<?xml version="1.0"?>
<x-ipc-info-package>
    <event>button</event>
    <button>
        <buttonID> 34 </buttonID>
    </button>
<x-ipc-info-package>
```

3. Reboot

The softswitch 105 requests the SIP user agent 103 to reboot by transmitting to the SIP user agent 103 a reboot NOTIFY message. Upon receiving the reboot NOTIFY message, the SIP user agent 103 determines whether and when to reboot. An example XML message body requesting the SIP user agent 103 to reboot is shown below:

```
<?xml version="1.0"?>
<x-ipc-info-package>
    <event>reboot</event>
</x-ipc-info-package>
```

4. Profile Change

A network administrator can change a profile for a user 101 or device at any time. A NOTIFY message is sent to the SIP user agent 103 carrying the information regarding what has changed, so the SIP user agent 103 can retrieve the change. A change may indicate that, for example, a table has changed, a specific row to a table has changed, or a specific column in a specific row to a table has changed. An example XML message body for updating the SIP user agent 103 with a change to the number, column, or row 546 of the button table is shown below:

```
<?xml version="1.0"?>
<x-ipc-info-package>
    <event>profileChange</event>
    <profileChange>
        <entity>button</entity>
        <attribute>number</attribute>
        <referenceID>546</referenceID>
    </profileChange>
</x-ipc-info-package>
```

5. Call Establishment & Feature Initiation

SIP user agent 103 and the softswitch 105 established calls by communicating to each other INVITE messages in accordance with RFC-3261, which is discussed above. The INVITE messages include one or more header indicating a request to initiate one or more specific call features. In the event that a specific call feature is to be initiated during a previously established dialog, the SIP user agent 103 initiates the feature by transmitting an INFO message to the softswitch 105 during the dialog.

D. Example SIP Message Traces

Example traces of SIP messages for certain features are shown below. In particular, the following is an example of an outgoing call from 3300 appearance 1 to 3600 using a left handset:

```
INVITE sip:3600@10.10.1.123:5060;transport=TCP SIP/2.0
From: "Rose"<sip:3300@10.10.1.123:5060>;tag=34ade8e8-0-
13c4-50029-79e03-6199b0e8-79e03
To: <sip:3600@10.10.1.123:5060>
Call-ID: 34b76128-0-13c4-50029-79e03-38e68ba2-79e03
CSeq: 1 INVITE
Via: SIP/2.0/TCP 10.10.1.121:5060;branch=z9hG4bK-79e03-
1dc13e31-5f8d6951
Max-Forwards: 70
Supported: timer,replaces,from-
change,histinfo,answermode,100rel
History-Info: <sip:3600@10.10.1.123:5060;transport=TCP>;
index=1
P-Asserted-Identity: "Rose"sip:3300@10.10.1.123
X-IPC-Call: type=resource;usage=1
X-IPC-CallParty: device=handset;channel=left
X-IPC-Privacy: on
X-IPC-Recording: on
X-IPC-Talkback: on
X-IPC-MuteOption: global
User-Agent: IPC SIP Turret - 1.0.0.0
Contact: <sip:3300@10.10.1.121:5060;transport=TCP>
Session-Expires: 300
Min-SE: 90
Recv-Info: x-ipc-events
Allow: INVITE,ACK,CANCEL,BYE,REFER,OPTIONS,
    NOTIFY,SUBSCRIBE,ACK,UPDATE,REGISTER,PUBLISH,INFO
Content-Type: application/sdp
Content-Length: 294...
```

Privacy and recording are enabled for the call and Rose has muted the global handset. An incoming intercom call from John Smith to Joe Brown is shown below:

```
INVITE sip:joe.brown@10.10.1.123:5060;transport=TCP
SIP/2.0
From: "John
Smith"<sip:john.smith@10.10.1.123:5060>;tag=34ade8e8-0-
13c4-50029-79e03-6199b0e8-79e03
To: <sip:joe.brown@10.10.1.123:5060>
Call-ID: 34b76128-0-13c4-50029-79e03-38e68ba2-79e03
CSeq: 1 INVITE
Via: SIP/2.0/TCP 10.10.1.121:5060;branch=z9hG4bK-79e03-
1dc13e31-5f8d6951
Max-Forwards: 70
Supported: timer,replaces,from-
change,histinfo,answermode,100rel
History-Info:
<sip:joe.brown@10.10.1.123:5060;transport=TCP>; index=1
P-Asserted-Identity: "John
Smith"sip:john.smith@10.10.1.123
X-IPC-Call: type=icmp2p
X-IPC-CallParty: device=handset;channel=left
X-IPC-Recording: on
X-IPC-Privacy: off
X-IPC-Talkback: on
Answer-Mode: Auto
User-Agent: IPC SIP LC - 15.02.01c
Contact: <sip:john.smith@10.10.1.121:5060;transport=TCP>
Session-Expires: 300
Min-SE: 90
Recv-Info: x-ipc-events
Allow:
INVITE,ACK,CANCEL,BYE,REFER,OPTIONS,NOTIFY,SUBSCRIBE,ACK,
UPDATE,REGISTER,PUBLISH,INFO
Content-Type: application/sdp
Content-Length:...
```

E. Example XML Schema

An exemplary XML schema, x-ipc-events, for implementing the embodiments described herein is shown below. The schema defines an XML NOTIFY body and an INFO body.

```xml
<xs:schema xmlns:xs="http://www.w3.org/2001/XMLSchema">
    <xs:element name="x-ipc-info-package">
        <xs:complexType>
            <xs:sequence>
                <xs:element name="event" type="eventType"
                use="required"/>
                    <xs:choice>
                        <xs:element name="privacy">
                            <xs:complexType>
                                <xs:sequence>
                                    <xs:element name="mode"
                                    type="mode"/>
                                    <xs:element name="result"
                                    type="result"/>
                                    <xs:element name="reason"
                                    type="xs:string"/>
                                </xs:sequence>
                            </xs:complexType>
                        </xs:element>
                        <xs:element name="record">
                            <xs:complexType>
                                <xs:sequence>
                                    <xs:element name="mode"
                                    type="mode"/>
                                </xs:sequence>
                            </xs:complexType>
                        </xs:element>
                        <xs:element name="injectAudio">
                            <xs:complexType>
                                <xs:sequence>
                                    <xs:element name="audioID"
                                    type="xs:integer"/>
                                    <xs:element name="direction"
                                    type="directionType"/>
                                    <xs:element name="duration"
                                    type="xs:integer"/>
```

```xml
            <xs:element name="action"
                type="actionType"/>
        </xs:sequence>
    </xs:complexType>
</xs:element>
<xs:element name="removeAudio">
    <xs:complexType>
        <xs:sequence>
            <xs:element name="audioID"
                type="xs:integer"/>
            <xs:element name="direction"
                type="directionType"/>
        </xs:sequence>
    </xs:complexType>
</xs:element>
<xs:element name="audioValidation">
    <xs:complexType>
        <xs:sequence>
            <xs:element name="result"
                type="result"/>
            <xs:element name="reason"
                type="xs:string"/>
            <xs:element name="MOS"
                type="xs:integer"/>
        </xs:sequence>
    </xs:complexType>
</xs:element>
<xs:element name="talkback">
    <xs:complexType>
        <xs:sequence>
            <xs:element name="mode"
                type="mode"/>
        </xs:sequence>
    </xs:complexType>
</xs:element>
<xs:element name="conference">
    <xs:complexType>
        <xs:sequence>
            <xs:element name="action"
                type="actionType"/>
            <xs:element name="aor"
                type="xs:string"/>
            <xs:element name="appearance"
                type="xs:integer"/>
            <xs:element name="result"
                type="result"/>
            <xs:element name="reason"
                type="xs:string"/>
        </xs:sequence>
    </xs:complexType>
</xs:element>
<xs:element name="diversion">
    <xs:complexType>
        <xs:sequence>
            <xs:element name="entity"
                type="xs:string"/>
            <xs:element name="divert_reason"
                type="reasontype"/>
            <xs:element
                name="destinationimmbusy"
                type="xs:string"/>
            <xs:element name="destinationRNA"
                type="xs:string"/>
        </xs:sequence>
    </xs:complexType>
</xs:element>
<xs:element name="barge">
    <xs:complexType>
        <xs:sequence>
            <xs:element name="name"
                type="xs:string"/>
            <xs:element name="numHandsetUsers"
                type="xs:integer"/>
        </xs:sequence>
    </xs:complexType>
</xs:element>
<xs:element name="logoff"/>
<xs:element name="logon">
    <xs:complexType>
        <xs:sequence>
```

```
                    <xs:element name="user"
                        type="xs:string"/>
                    <xs:element name="password"
                        type="xs:string"/>
                </xs:sequence>
            </xs:complexType>
        </xs:element>
        <xs:element name="failover">
            <xs:complexType>
                <xs:sequence>
                    <xs:element name="zoneID"
                        type="xs:integer"/>
                </xs:sequence>
            </xs:complexType>
        </xs:element>
        <xs:element name="centerline">
            <xs:complexType>
                <xs:sequence>
                    <xs:element name="text"
                        type="xs:string"/>
                    <xs:element name="ring"
                        type="mode"/>
                </xs:sequence>
            </xs:complexType>
        </xs:element>
        <xs:element name="button">
            <xs:complexType>
                <xs:sequence>
                    <xs:element name="buttonID"
                        type="xs:integer"/>
                </xs:sequence>
            </xs:complexType>
        </xs:element>
        <xs:element name="hold"/>
        <xs:element name="recall"/>
        <xs:element name="signal">
            <xs:complexType>
                <xs:sequence>
                    <xs:element name="mode"
                        type="mode"/>
                </xs:sequence>
            </xs:complexType>
        </xs:element>
        <xs:element name="profileChange">
            <xs:complexType>
                <xs:sequence>
                    <xs:element name="entity"
                        type="xs:string"/>
                    <xs:element name="attribute"
                        type="xs:string"/>
                    <xs:element name="referenceID"
                        type="xs:integer"/>
                </xs:sequence>
            </xs:complexType>
        </xs:element>
    </xs:choice>
</xs:sequence>
</xs:complexType>
</xs:element>
<xs:simpleType name="eventType">
    <xs:restriction base="xs:string">
        <xs:enumeration value="privacy"/>
        <xs:enumeration value="record"/>
        <xs:enumeration value="injectAudio"/>
        <xs:enumeration value="removeAudio"/>
        <xs:enumeration value="audioValidation"/>
        <xs:enumeration value="talkback"/>
        <xs:enumeration value="conference"/>
        <xs:enumeration value="diversion"/>
        <xs:enumeration value="barge"/>
        <xs:enumeration value="logoff"/>
        <xs:enumeration value="logon"/>
        <xs:enumeration value="failover"/>
        <xs:enumeration value="centerline"/>
        <xs:enumeration value="button"/>
        <xs:enumeration value="hold"/>
        <xs:enumeration value="recall"/>
        <xs:enumeration value="signal"/>
        <xs:enumeration value="reboot"/>
        <xs:enumeration value="profileChange"/>
```

-continued

```
        </xs:restriction>
    </xs:simpleType>
    <xs:simpleType name="mode">
        <xs:restriction base="xs:string">
            <xs:enumeration value="on"/>
            <xs:enumeration value="off"/>
        </xs:restriction>
    </xs:simpleType>
    <xs:simpleType name="directionType">
        <xs:restriction base="xs:string">
            <xs:enumeration value="touser"/>
            <xs:enumeration value="tonetwork"/>
            <xs:enumeration value="both"/>
        </xs:restriction>
    </xs:simpleType>
    <xs:simpleType name="actionType">
        <xs:restriction base="xs:string">
            <xs:enumeration value="validate"/>
            <xs:enumeration value="addparty"/>
            <xs:enumeration value="removeparty"/>
            <xs:enumeration value="partyleave"/>
        </xs:restriction>
    </xs:simpleType>
    <xs:simpleType name="reasontype">
        <xs:restriction base="xs:string">
            <xs:enumeration value="none"/>
            <xs:enumeration value="immediate"/>
            <xs:enumeration value="busy"/>
            <xs:enumeration value="noanswer"/>
            <xs:enumeration value="busyornoanswer"/>
        </xs:restriction>
    </xs:simpleType>
    <xs:simpleType name="result">
        <xs:restriction base="xs:string">
            <xs:enumeration value="pass"/>
            <xs:enumeration value="fail"/>
        </xs:restriction>
    </xs:simpleType>
</xs:schema>
```

II. Example Implementations

The present invention (e.g., system 100, or any part(s) or function(s) thereof) can be implemented using hardware, software or a combination thereof and can be implemented in one or more computer systems or other processing systems. However, the manipulations performed by the present invention were often referred to in terms, such as establishing or discovering, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 2:
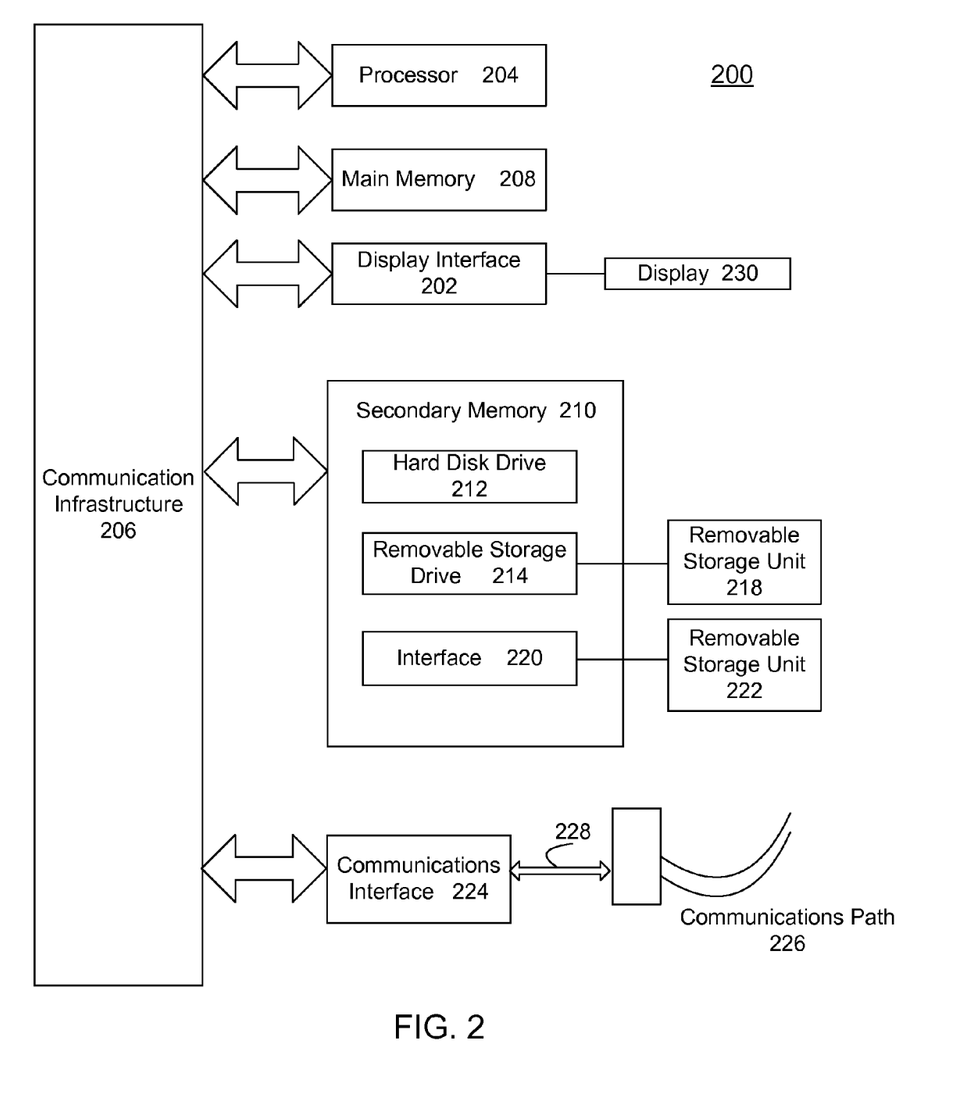
FIG. 2 depicts a block diagram of an exemplary computer system useful for implementing the present invention.

In fact, in one embodiment, the invention is directed toward one or more computer systems capable of carrying out the functionality described herein. An example of a computer system 200 is shown in FIG. 2.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230.

Computer system 200 also includes a main memory 208, preferably random access memory (RAM), and can also include a secondary memory 210. The secondary memory 210 can include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218 represents a floppy disk, magnetic tape, optical disk, etc. which is read by and written to by removable storage drive 214. As will be appreciated, the removable storage unit 218 includes a computer usable storage medium having stored therein computer software and/or data.

In alternative embodiments, secondary memory 210 can include other similar devices for allowing computer programs or other instructions to be loaded into computer system 200. Such devices can include, for example, a removable storage unit 222 and an interface 220. Examples of such can include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 can also include a communications interface 224. Communications interface 224 allows software and data to be transferred between computer system 200 and external devices. Examples of communications interface 224 can include a modem, a network interface (such as an Ethernet card), a communications port, a Personal Computer Memory Card International Association (PCMCIA) slot and card, etc. Software and data transferred via communications interface 224 are in the form of signals 228 which can be electronic, electromagnetic, optical or other signals capable of being received by communications interface 224. These signals 228 are provided to communications interface 224 via a communications path (e.g., channel) 226. This channel 226 carries signals 228 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 214, a hard disk installed in hard disk drive 212, and/or signals 228. These computer program products provide software to computer system 200. The invention is directed to such computer program products.

Computer programs (also referred to as computer control logic) are stored in main memory 208 and/or secondary memory 210. Computer programs can also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software can be stored in a computer program product and loaded into computer system 200 using removable storage drive 214, hard drive 212 or communications interface 224. The control logic (software), when executed by the processor 204, causes the processor 204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for controlling calls and monitoring resource status for turret systems, the method comprising the steps of:
    receiving, from a session initiation protocol (SIP) user agent over a communication network, a SIP message including at least one of a header field and an event package, the header field including a first parameter corresponding to a first call feature, the event package including a second parameter corresponding to a second call feature, wherein the header field and the event package correspond to telephony features of a voice trading system including a plurality of turrets and at least one turret switching system; and
    implementing, by a softswitch or a SIP-enabled turret, at least one of the first call feature and the second call feature in response to receiving the SIP message.

2. The method of claim 1, wherein the SIP message includes at least one of an INVITE message, an INFO message, a NOTIFY message, an UPDATE message, a PRACK message, and an ACK message.

3. The method of claim 1, wherein the header field includes at least one of a call party header field, a call header field, a token header field, an augmentation header field, a logon header field, a privacy header field, a muting header field, a talkback header field, and a recording header field.

4. The method of claim 1, wherein the event package includes at least one of a privacy event, a recording event, a talkback event, a conference event, a diversion event, a centerline event, a backroom logon event, a forced logoff event, a forced logon event, a failover event, and a failback event.

5. The method of claim 1, wherein at least one of the first call feature and the second call feature includes at least one of a privacy call feature, a recording call feature, a diagnostic call feature, a talkback call feature, a conference call feature, a diversion call feature, a logoff call feature, a logon call feature, a centerline call feature, a failover call feature, a failback call feature, and a button press call feature.

6. The method of claim 1, wherein the header field further includes at least one of a device parameter, a channel parameter, a usage parameter, and a hash value.

7. A non-transitory computer-readable medium having stored thereon sequences of instructions, the sequences of instructions including instructions, which, when executed by a computer system, cause the computer system to:
    receive, from a session initiation protocol (SIP) user agent over a communication network, a SIP message including at least one of a header field and an event package, the header field including a first parameter corresponding to a first call feature, the event package including a second parameter corresponding to a second call feature, wherein the header field and the event package correspond to telephony features of a voice trading system including a plurality of turrets and at least one turret switching system; and
    implement, by a softswitch or a SIP-enabled turret, at least one of the first call feature and the second call feature in response to receiving the SIP message.

8. The non-transitory computer-readable medium of claim 7, wherein the SIP message includes at least one of an INVITE message, an INFO message, a NOTIFY message, an UPDATE message, a PRACK message, and an ACK message.

9. The non-transitory computer-readable medium of claim 7, wherein the header field includes at least one of a call party header field, a call header field, a token header field, an augmentation header field, a logon header field, a privacy header field, a muting header field, a talkback header field, and a recording header field.

10. The non-transitory computer-readable medium of claim 7, wherein the event package includes at least one of a privacy event, a recording event, a talkback event, a conference event, a diversion event, a centerline event, a backroom logon event, a forced logoff event, a forced logon event, a failover event, and a failback event.

11. The non-transitory computer-readable medium of claim 7, wherein at least one of the first call feature and the second call feature includes at least one of a privacy call feature, a recording call feature, a diagnostic call feature, a talkback call feature, a conference call feature, a diversion call feature, a logoff call feature, a logon call feature, a centerline call feature, a failover call feature, a failback call feature, and a button press call feature.

12. The non-transitory computer-readable medium of claim 7, wherein the header field further includes at least one of a device parameter, a channel parameter, a usage parameter, and a hash value.

13. A turret call control and resource status monitoring system, comprising:
a softswitch or a SIP-enabled turret including a memory coupled to a processor, wherein the processor is configured to:
receive, from a SIP user agent over a communication network, a session initiation protocol (SIPS message including at least one of a header field and an event package, the header field including a first parameter corresponding to a first call feature, the event package including a second parameter corresponding to a second call feature, wherein the header field and the event package correspond to telephony features of a voice trading system including a plurality of turrets and at least one turret switching system; and
implement at least one of the first call feature and the second call feature in response to receiving the SIP message.

14. The system of claim 13, wherein the SIP message includes at least one of an INVITE message, an INFO message, a NOTIFY message, an UPDATE message, a PRACK message, and an ACK message.

15. The system of claim 13, wherein the header field includes at least one of a call party header field, a call header field, a token header field, an augmentation header field, a logon header field, a privacy header field, a muting header field, a talkback header field, and a recording header field.

16. The system of claim 13, wherein the event package includes at least one of a privacy event, a recording event, a talkback event, a conference event, a diversion event, a centerline event, a backroom logon event, a forced logoff event, a forced logon event, a failover event, and a failback event.

17. The system of claim 13, wherein at least one of the first call feature and the second call feature includes at least one of a privacy call feature, a recording call feature, a diagnostic call feature, a talkback call feature, a conference call feature, a diversion call feature, a logoff call feature, a logon call feature, a centerline call feature, a failover call feature, a failback call feature, and a button press call feature.

18. The system of claim 13, wherein the header field further includes at least one of a device parameter, a channel parameter, a usage parameter, and a hash value.

* * * * *

UNITED STATES PATENT AND TRADEMARK OFFICE
CERTIFICATE OF CORRECTION

PATENT NO.       : 8,363,572 B2                                  Page 1 of 1
APPLICATION NO.  : 12/762670
DATED            : January 29, 2013
INVENTOR(S)      : Timothy Potts et al.

It is certified that error appears in the above-identified patent and that said Letters Patent is hereby corrected as shown below:

ON TITLE PAGE ITEM [56] REFERENCES CITED:

Other Publications, Under Drage et al., "identifieda" should read --identifica- --.

IN THE SPECIFICATION:

COLUMN 2:

Line 54, "manage" should read --manages--.

COLUMN 3:

Line 46, "for" should be deleted.

COLUMN 16:

Line 20, "header" should read --headers--.

Signed and Sealed this
Twentieth Day of May, 2014

Michelle K. Lee
*Deputy Director of the United States Patent and Trademark Office*